United States Patent
Li et al.

(10) Patent No.: US 9,110,969 B2
(45) Date of Patent: Aug. 18, 2015

(54) ASSOCIATION ACCELERATION FOR TRANSACTION DATABASES

(71) Applicants: Wen-Syan Li, Fremont, CA (US); Wen Jiang, Shanghai (CN); Tianyu Luwang, Shanghai (CN)

(72) Inventors: Wen-Syan Li, Fremont, CA (US); Wen Jiang, Shanghai (CN); Tianyu Luwang, Shanghai (CN)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 13/746,791

(22) Filed: Jan. 22, 2013

(65) Prior Publication Data
US 2014/0032514 A1 Jan. 30, 2014

Related U.S. Application Data

(60) Provisional application No. 61/675,686, filed on Jul. 25, 2012.

(51) Int. Cl.
*G06F 17/00* (2006.01)
*G06F 17/30* (2006.01)

(52) U.S. Cl.
CPC .... *G06F 17/30595* (2013.01); *G06F 17/30536* (2013.01)

(58) Field of Classification Search
CPC .............. G06F 17/30595; G06F 17/30596
USPC ........................................ 707/703
See application file for complete search history.

(56) References Cited

U.S. PATENT DOCUMENTS

| | | | |
|---|---|---|---|
| 5,615,341 A | | 3/1997 | Agrawal et al. |
| 5,724,573 A | * | 3/1998 | Agrawal et al. .................. 1/1 |
| 5,794,209 A | | 8/1998 | Agrawal et al. |
| 6,049,797 A | * | 4/2000 | Guha et al. .................... 1/1 |
| 6,061,682 A | | 5/2000 | Agrawal et al. |
| 6,094,645 A | * | 7/2000 | Aggarwal et al. ............ 706/47 |
| 6,182,070 B1 | * | 1/2001 | Megiddo et al. ............ 707/694 |
| 6,189,005 B1 | * | 2/2001 | Chakrabarti et al. ............. 1/1 |
| 6,278,997 B1 | * | 8/2001 | Agrawal et al. .................. 1/1 |
| 6,324,533 B1 | * | 11/2001 | Agrawal et al. .................. 1/1 |
| 6,763,354 B2 | * | 7/2004 | Hosken .......................... 1/1 |

(Continued)

FOREIGN PATENT DOCUMENTS

| WO | WO-2004038610 A2 | 5/2004 |
|---|---|---|
| WO | WO-2007048008 A2 | 4/2007 |

OTHER PUBLICATIONS

Nikovski, Daniel, et al., "Induction of Compact Decision Trees for Personalized Recommendation", SAC '06, Dijon, France, Apr. 23-27, 2006, pp. 575-581.*

(Continued)

*Primary Examiner* — Robert Stevens
(74) *Attorney, Agent, or Firm* — Brake Hughes Bellermann LLP

(57) ABSTRACT

An association rule accelerator may be used to access a transaction database storing a plurality of transactions, each transaction including one or more items. The association rule accelerator also may select a sampling rate based on an item frequency of frequent items within the transaction database, relative to a sampled item frequency of sampled items within a corresponding sampled transaction database. An an association rule selector may determine, using the selected sampling rate and corresponding sampled transaction database, frequent item sets within the sampled transactions, and may further determine an association rule relating at least two items of the sampled transactions, based on the frequent item sets.

18 Claims, 9 Drawing Sheets

(56) References Cited

U.S. PATENT DOCUMENTS

| | | | |
|---|---|---|---|
| 7,231,384 B2 * | 6/2007 | Wu et al. ............................... | 1/1 |
| 7,289,984 B2 * | 10/2007 | Beekmann et al. ........... | 707/776 |
| 7,349,914 B1 * | 3/2008 | Ordonez .............................. | 1/1 |
| 7,433,879 B1 * | 10/2008 | Sharma et al. ....................... | 1/1 |
| 7,512,580 B2 * | 3/2009 | Ronnewinkel .................... | 706/52 |
| 7,668,793 B2 * | 2/2010 | Beekmann et al. ............. | 706/45 |
| 7,672,865 B2 * | 3/2010 | Kumar et al. ................ | 705/7.33 |
| 7,680,685 B2 | 3/2010 | Ouimet et al. | |
| 7,698,170 B1 | 4/2010 | Darr et al. | |
| 7,711,670 B2 | 5/2010 | Roediger | |
| 7,720,720 B1 | 5/2010 | Sharma et al. | |
| 7,831,548 B1 * | 11/2010 | Round et al. ................. | 707/609 |
| 7,966,219 B1 | 6/2011 | Singh et al. | |
| 8,140,391 B2 | 3/2012 | Jacobi et al. | |
| 8,301,665 B2 * | 10/2012 | Sieb .............................. | 707/797 |
| 8,370,203 B2 | 2/2013 | Dicker et al. | |
| 8,401,986 B1 * | 3/2013 | Franke ............................ | 706/47 |
| 2002/0174087 A1 * | 11/2002 | Hao et al. ............................ | 707/1 |
| 2003/0217055 A1 * | 11/2003 | Lee et al. .......................... | 707/6 |
| 2004/0083232 A1 * | 4/2004 | Ronnewinkel et al. .... | 707/104.1 |
| 2005/0189415 A1 * | 9/2005 | Fano et al. ..................... | 235/383 |
| 2006/0074824 A1 * | 4/2006 | Li .................................. | 706/20 |
| 2007/0011162 A1 * | 1/2007 | Yoshida ............................ | 707/6 |
| 2010/0049538 A1 * | 2/2010 | Frazer et al. ....................... | 705/1 |
| 2010/0324985 A1 * | 12/2010 | Kumar et al. ............. | 705/14.25 |
| 2012/0123844 A1 * | 5/2012 | Fano et al. ................. | 705/14.25 |
| 2012/0130964 A1 * | 5/2012 | Yen et al. ...................... | 707/693 |
| 2012/0254242 A1 * | 10/2012 | Kanagasabapathi et al. . | 707/776 |
| 2013/0014026 A1 | 1/2013 | Beringer et al. | |
| 2013/0191377 A1 * | 7/2013 | Zelevinsky et al. ........... | 707/723 |
| 2013/0204830 A1 * | 8/2013 | Franke ............................ | 706/47 |

OTHER PUBLICATIONS

Maneewongvatana, Suthathip, et al., "A Recommendation Model for Personalized Book Lists", ISCIT 2010, Tokyo, Japan, Oct. 26-29, 2010, pp. 389-394.*

Dunham, Margaret H., et al., "A Survey of Association Rules", Technical Report, Southern Methodist University, Dept. of Computer Science, Technical Report TR 00-CSE-8, downloaded Jan. 5, 2008, 65 pages.*

Brin, Sergey, et al., "Dynamic Itemset Counting and Implication Rules for Market Basket Data", SIGMOD '97, Tucson, AZ, May 11-15, 1997, pp. 255-264.*

Cai, C. H., et al., "Mining Association Rules with Weighted Items", IDEAS '98, Cardiff, Wales, UK, Jul. 8-10, 1998, pp. 68-77.*

Toivonen, Hannu, "Sampling Large Databases for Association Rules", Proc. of the 22nd VLDB Conf., Mumbai, India, © 1996, pp. 1-12.*

Cheung, David W., et al., "Efficient Mining of Association Rules in Distributed Databases", IEEE Transactions on Knowledge and Data Engineering, vol. 8, No. 6, Dec. 1996, pp. 911-922.*

Agrawal, Rakesh, et al., "Mining Association Rules between Sets of Items in Large Databases", SIGMOD '93, Washington, DC, May 25-28, 1993, pp. 207-216.*

"Database", Wikipedia, downloaded from: en.wikipedia.org/wiki/Database on Dec. 10, 2014, pp. 1-23.*

"Mining Frequent Patterns, Associations, and Correlations: Basic Concepts and Methods", Data Mining Concepts and Techniques, Chapter 6, 2012 Elsevier Inc., pp. 243-278.

Sarwar, et al, "Item-Based Collaborative Filtering Recommendation Algorithms", WWW10, May 15, 2001, 11 pages.

Agrawal, et al, "Mining Association Rules Between Sets of Items in Large Databases", SIGMOD'93, 1993, 10 pages.

Bayardo, "Efficiently Mining Long Patterns from Databases", 1998 ACM-SIGMOD International Conference on Management of Data, 1998, pp. 85-93.

Pasquier, et al, "Discovering Frequent Closed Itemsets for Association Rules", ICDT'99, 1999, 19 pages.

Agrawal, et al, "Mining Sequential Patterns", ICDE'95, 1995, 12 pages.

Agrawal, et al, "Fast Algorithms for Mining Association Rules", VLDB'94, 1994, 13 pages.

Mannila, et al, "Efficient Algorithms for Discovering Association Rules", AAAI Technical Report WS-94-03, 1994, 12 pages.

Savasere, et al, "An Efficient Algorithm for Mining Association Rules in Large Databases", VLDB'95, 1995, 13 pages.

Park "An Effective Hash-Based Algorithm for Mining Association Rules", SIGMOD'95, 1995, 12 pages.

Toivonen, "Sampling Large Databases for Association Rules", VLDB'96, 1996, 12 pages.

Brin, et al, "Dynamic Itemset Counting and Implication Rules for Market Basket Data", SIGMOD'97, May 1997, 10 pages.

Sarawagi, et al, "Integrating Association Rule Mining with Relational Database Systems: Alternatives and Implications", SIGMOD'98, 1998, 12 pages.

Agarwal, et al, "A Tree Projection Algorithm for Generation of Frequent Itemsets", Parallel and Distributed Computing:02, 2002, 23 pages.

Han, et al, "Mining Frequent Patterns without Candidate Generation: A Frequent-Pattern Tree Approach", SIGMOD'00, 2000, 35 pages.

Liu, et al, Mining Frequent Item Sets by Opportunistic Projection, KDD'02, 2002, 10 pages.

Han, et al, "Mining Top•K Frequent Closed Patterns without Minimum Support", ICDM'02, 2002, 8 pages.

Wang, et al, "Closet+: Searching for the Best Strategies for Mining Frequent Closed Itemsets", KDD'03, 2003, 10 pages.

Liu, et al, "On Computing, Storing and Querying Frequent Patterns", KDD'03, 2003, 6 pages.

Grahne, et al, "Efficiently Using Prefix-trees in Mining Frequent Itemsets", Proceedings of the ICDM'03 International Workshop on Frequent Itemset Mining Implementations (FIMI'03), Nov. 2003, 10 pages.

Brin, et al, "Beyond Market Baskets: Generalizing Association Rules to Correlations", SIGMOD'97, 1997, 12 pages.

Bucila, et al, "DualMiner: A Dual-Pruning Algorithm for Itemsets with Constraints", KDD '02, 2002, 10 pages.

Dasu, et al, "Mining Database Structure; Or, How to Build a Data Quality Browser", SIGMOD'02, 2002, 12 pages.

Huhtala, et al, "Efficient Discovery of Functional and Approximate Dependencies Using Partitions", ICDE'98, 1998, 10 pages.

Jagadish, et al, "Semantic Compression and Pattern Extraction with Fascicles", VLDB'99, 1999, 12 pages.

Klemettinen, et al, "Finding Interesting Rules from Large Sets of Discovered Association Rules", CIKM'94, 1994, 7 pages.

Liu, et al, "Mining Frequent Patterns from Very High Dimensional Data: A Top-Down Row Enumeration Approach", SDM'06, 2006, 12 pages.

Omiecinski, "Alternative Interest Measures for Mining Associations in Databases", TDKE'03, 2003, 31 pages.

Pan, et al, "Carpenter: Finding Closed Patterns in Long Biological Datasets", KDD 2003, 54 pages.

Silverstein, et al, "Scalable Techniques for Mining Causal Structures", VLDB'98, 1998, 12 pages.

Tan, et al, "Selecting the Right Interestingness Measure for Association Patterns", KDD'02, 2002, 10 pages.

Wang, et al, "Profit Mining: From Patterns to Actions", EDBT'02, 2002, 18 pages.

Wu, et al, "Association Mining in Large Databases: A Re-Examination of Its Measures", PKDD'07, 2007, 8 pages.

Zaki, et al, "Charm: An Efficient Algorithm for Closed Itemset Mining", SDM '02, 2002, 17 pages.

Zaki, et al, "Parallel Algorithm for Discovery of Association Rules", DAMI: 97, 1997, 31 pages.

* cited by examiner

ASSOCIATION ACCELERATION FOR TRANSACTION DATABASES

CROSS-REFERENCE TO RELATED APPLICATION

This application is a Nonprovisional of, and claims priority under 35 U.S.C. 119 to, U.S. Patent Application No. 61/675,686, filed on Jul. 25, 2012, entitled "ACCELERATION OF RECOMMENDATIONS FOR SALES OPPORTUNITIES", which is incorporated by reference herein in its entirety.

TECHNICAL FIELD

This description relates to transaction databases.

BACKGROUND

Conventional database systems are capable of storing relatively large quantities of data. Businesses, individuals, and other entities may wish to utilize such data, in order to achieve some desired goal. However, as a practical matter, such entities may be unable or unwilling to deploy computational resources which are sufficient to process the data in a timely, accurate, cost-effective, and/or efficient manner.

For example, businesses may maintain transaction databases which record individual transactions conducted between the business and its various customers. Such a business may wish to analyze its transaction data, e.g., with the intention of increasing future profits. For example, a business may wish to analyze its transaction database for the purpose of recommending particular products/services for sale to individual existing/potential customers. In this way, the business may increase sales by ensuring that potential purchasers are presented with opportunities to purchase products/services that are of particular interest or use to them.

However, as referenced above, it may be difficult or impossible for such businesses to generate such recommendations in a manner which is sufficiently fast, accurate, cost-effective, and/or otherwise efficient. As a result, it may be difficult for such businesses to generate desired recommendations in a sufficiently timely manner. Consequently, such businesses may be limited in their ability to achieve desired levels of profit, and/or desired levels of customer satisfaction.

SUMMARY

According to one general aspect, a system may include instructions recorded on a computer-readable medium, and executable by at least one processor. The system may include an association rule accelerator configured to cause the at least one processor to access a transaction database storing a plurality of transactions, each transaction including one or more items, and further configured to select a sampling rate based on an item frequency of frequent items within the transaction database, relative to a sampled item frequency of sampled items within a corresponding sampled transaction database. The system may include an association rule selector configured to cause the processor to determine, using the selected sampling rate and corresponding sampled transaction database, frequent item sets within the sampled transactions, and further to determine an association rule relating at least two items of the sampled transactions, based on the frequent item sets.

According to another general aspect, a computer-implemented method for executing instructions stored on a computer readable storage medium may include accessing a transaction database storing a plurality of transactions, each transaction including one or more items, and selecting a sampling rate based on an item frequency of frequent items within the transaction database, relative to a sampled item frequency of sampled items within a corresponding sampled transaction database. The method also may include determining, using the selected sampling rate and corresponding sampled transaction database, frequent item sets within the sampled transactions, and determining an association rule relating at least two items of the sampled transactions, based on the frequent item sets.

According to another general aspect, a computer program product tangibly embodied on a computer-readable storage medium may comprise instructions that, when executed, are configured to access a transaction database storing a plurality of transactions, each transaction including one or more items, and select a sampling rate based on an item frequency of frequent items within the transaction database, relative to a sampled item frequency of sampled items within a corresponding sampled transaction database. The instructions, when executed, may be further configured to determine, using the selected sampling rate and corresponding sampled transaction database, frequent item sets within the sampled transactions, and determine an association rule relating at least two items of the sampled transactions, based on the frequent item sets.

The details of one or more implementations are set forth in the accompanying drawings and the description below. Other features will be apparent from the description and drawings, and from the claims.

DETAILED DESCRIPTION

Figure 1:
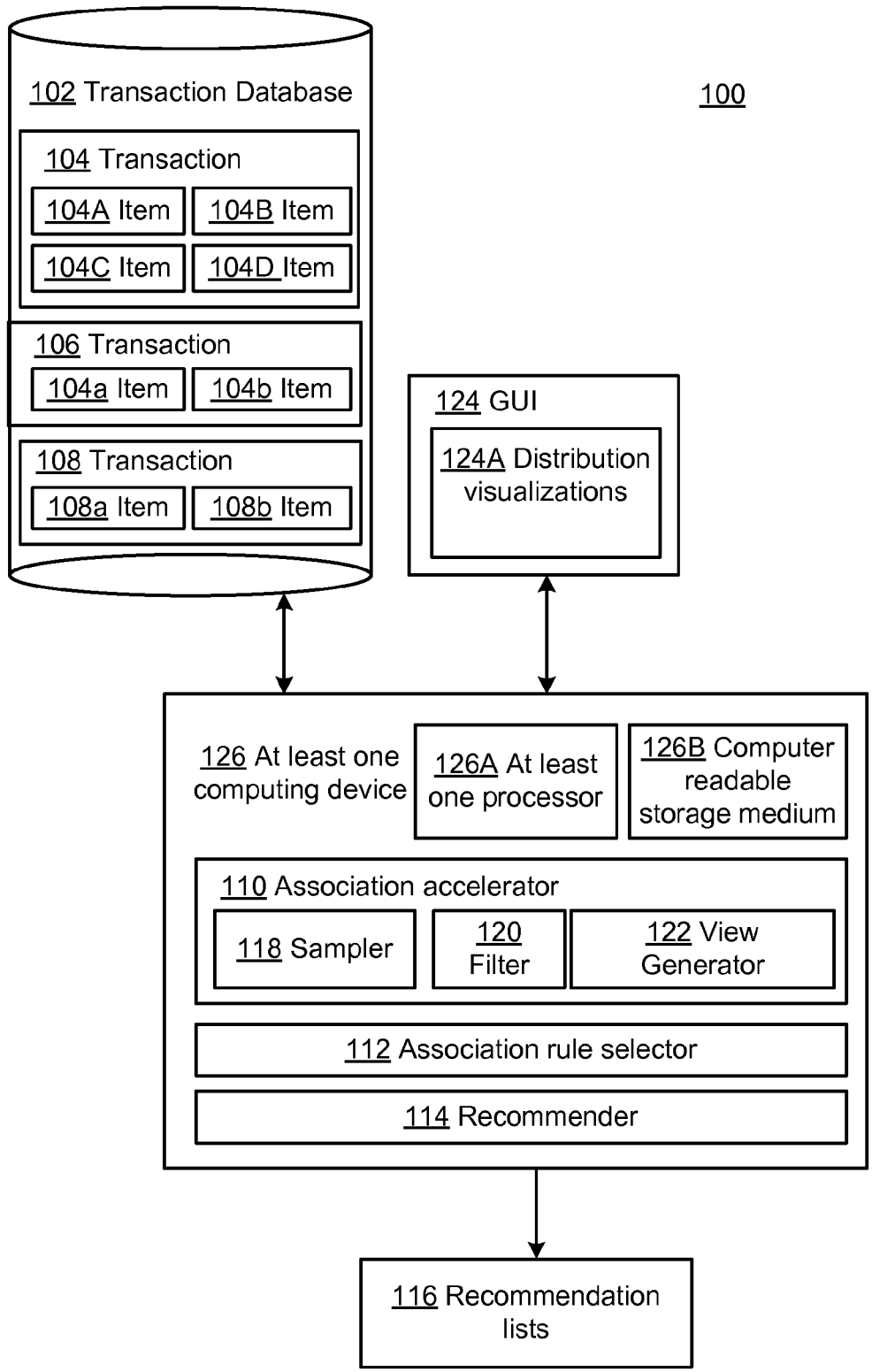
FIG. 1 is a block diagram of a system for association acceleration for transaction databases.

FIG. 1 is a block diagram of a system 100 for association acceleration for transaction databases. In the example of FIG. 1, a transaction database 102 is illustrated as including transactions 104, 106, 108. As shown, the transaction 104 is illustrated as including items 104A, 104B, 104C, 104D. Meanwhile, the transaction 106 is illustrated as also including items 104A, 104B, while the transaction 108 is illustrated as including items 108A, 108B.

For purposes of the example of FIG. 1, it may be appreciated that the transactions 104, 106, 108 may represent or include, e.g., virtually any discrete interaction between two or more entities. More specifically, in many of the examples included in the present description, such entities may include providers and consumers of goods and services, so that the various transactions 104, 106, 108 may be understood to represent, for example, consummated purchases of such goods/services by the consumers, from corresponding providers thereof. Thus, the transaction database 102 may be constructed, maintained, and utilized, for example, by one or more such providers, in order, for example, to maintain a historical record of sales, and also to increase a likelihood of future transactions with the same or different consumers.

Of course, such examples are intended merely for the sake of illustration and explanation, and should not be considered to be limiting in terms of a nature of the transaction database 102. For example, it may be appreciated that the transaction database 102 may store transactions representing virtually any interaction between two or more entities, as referenced above. For example, in addition to the various commercial, profit-based transactions referenced above, the transactions 104, 106, 108 may represent interactions of/between various nonprofit entities, such as, for example, schools, governments, religious, or charitable organizations. Consequently, the various items 104A-104D and 108A, 108B illustrated in the transaction database 102 may represent any corresponding aspect of such interactions. Nonetheless, as referenced above, for purposes of illustration and example, the transaction database 102 is primarily described herein with respect to commercial transactions 104, 106, 108 between providers and consumers/customers, so that, in such examples, the various items 104A-104D and 108A, 108B represent goods and/or services exchanged in the context of such commercial interactions.

In such contexts, a provider, operator, and/or user of the system 100 may seek to analyze the transaction database 102 in order, for example, to maximize profits related to future transactions to be conducted. For example, as shown, an association accelerator 110 may be configured to optimize operations of an association rule selector 112 in determining rules which associate various items of the transaction database 102 in a predictive fashion, so that a recommender 114 may ultimately provide recommendation lists 116 to current and/or future customers. In this way, for example, a customer wishing to purchase item 104A, or having previously purchased item 104A, may be provided with a recommendation to consider purchasing item 104B. Since the customer in question may not otherwise have considered the purchase of item 104B, any such purchase of the item 104B in such context may represent an increase in sales and profit experienced by the provider of the system 100.

In a highly specific and highly simplified example scenario, it may occur that the transaction database 102 stores transactions 104, 106, 108 conducted by a grocery store. Consequently, for example, the transaction 104 conducted with a particular customer at a particular time may include items 104A, 104B, 104C, 104D which represent, respectively, coffee, diapers, eggs, and milk. Then, it may be observed that the transaction 106, conducted with, in the example, a different customer, also includes items 104A, 104B, i.e., coffee and diapers, respectively. Meanwhile, the transaction 108, conducted in the example with a different customer, is illustrated as including different items 108A, 108B, representing in the example, beer and nuts, respectively.

In the simplified example, the association accelerator 110 and the association rule selector 112 may be configured to determine various rules which characterize associations between two or more of the various items stored in association with corresponding transactions 104, 106, 108 of the transaction database 102. For example, some such association rules may depend on, or be determined by, a frequency of a given set of items within individual transactions of the transaction database 102. For example, in the simplified example of FIG. 1, the set of items 104A, 104B may be observed to exist within both of the transactions 104 and 106. That is, the term "item set" should be understood to refer to a two or more items within an individual transaction, regardless of whether such an item set represents an entirety of the items included within the corresponding transaction (as in the example of the transaction 106), or merely a subset of all items included within a corresponding transaction (as in the example of the transaction 104), and regardless of whether there exist any other logical or known connection between the items of the item set (that is, other than appearing within the same transaction).

When such an item set is found to occur frequently within transactions of the transaction database 102, then it may be said that such an item set provides support for a corresponding association rule which, as the name implies, associates the items of the frequently-occurring item set with one another. In other words, it may be said that support for an association rule which associates two or more items with one another is defined by a frequency of the corresponding item set within the transaction database.

In many cases, a minimum level of support (i.e., "minimum support") may be defined, so that a level of support below the minimum will not generally result in a corresponding association rule linking items within corresponding item sets, while frequencies at or above the minimum support may be further considered for potential inclusion in corresponding association rules. In this regard, it may be appreciated that minimum support may be defined in terms of either an absolute number of times that an item set occurs in the transaction database 102, and/or in terms of a relative frequency with which a given item set occurs within the transaction database 102. For example, in absolute numbers, it may be observed that the item set 104A, 104B occurs two times within the transaction database 102 (i.e., within transactions 104 and 106). Consequently, if minimum support is defined as an absolute number occurrences of an item set, then a minimum support level of two item sets would be met for the item set 104A, 104B, while a minimum support level of three item sets would not be met. Similarly, it may be observed that the item set 104A, 104B occurs within approximately 67% of the transactions 104, 106, 108 of the transaction database 102. Therefore, again, a minimum support level of 67% would be met by the item set 104A, 104B.

Thus, the term support may be understood to represent a probability that a given transaction contains a union of two or more items. Additionally, or alternatively, various other metrics may be utilized in determining associations between items of the transaction database 102. For example, a confidence metric may be defined characterizing a conditional probability that a transaction containing a first particular item also contains a second particular item. For example, in the example of FIG. 1, such a confidence metric might be established with respect to the items 104A, 104B. That is, it may be observed that the conditional probability that a transaction containing the item 104A will include the item 104B is 100%. In other words, it may be observed that all transactions having the item 104A also have the item 104B (and vice-versa). As with the support metric as referenced above, such a confidence metric also may be defined with respect to a minimum confidence level that is desired or required before constructing an association rule for an item set in question.

With specific reference back to the example provided above, it may thus be said that an association rule linking coffee and diapers (i.e., items 104A, 104B, respectively) has a support level of two and/or 67%, and that a confidence level that a customer purchasing coffee also purchases diapers is 100%. Thus, if such support/confidence levels meet or exceed pre-defined minimum levels, an association rule linking coffee to diapers may be formed, and ultimately utilized by the recommender 114 (e.g., in conjunction with specific characteristics of a current customer) to generate the recommendation list(s) 116. For example, the recommender 114, in response to a current purchase of coffee by a particular customer, may provide a suggestion of a purchase of diapers in conjunction therewith. In other examples, the recommender 114 may recommend both coffee and diapers to a particular customer, who may not have become actively engaged in a current transaction as of yet.

The support and confidence metrics just described, are, by themselves, known in the art, and are therefore not described in further detail herein, except as may be necessary or helpful in understanding operations of the system 100 of FIG. 1. Moreover, many additional or alternative metrics may be utilized by the association accelerator 110 and/or the association rule selector 112 in defining and constructing corresponding association rules to be utilized by the recommender 114. Rather, it may be appreciated that the support and confidence metrics are included herein as specific, non-limiting examples of metrics utilized by the association rule selector 112.

In the example, it may be observed that the support and confidence metrics for the item set 104A, 104B may be calculated in a straightforward manner for the transaction database 102. Of course, in practice, as referenced above, the transaction database 102 may include thousands, millions, or more transactions, where each transaction may include a variable and potentially large number of individual items.

Moreover, association rules may be desired for various types, numbers, and combinations of item sets, where such item sets may conclude a quantity much greater than a quantity of the items themselves. For example, for a retailer which sells 10,000 items, it may be desirable to look for association rules associating two items to another item within transactions conducted with respect to the 10,000 items for sale. In this example, there may be approximately one trillion such potential association rules. In practice, of course, many retailers and other enterprisers may be concerned with a much larger collection of items, and may conduct a huge number of transactions with a correspondingly large number of consumers. Moreover, it may occur that such retailers and other enterprisers may seek to expand inventory and increase sales over time, so that the transaction database 102 may represent an extremely large and growing database of transaction records.

Thus, in practice, it may be difficult or impossible (e.g., cost prohibitive) for a provider of the system 100 to perform a desired analysis for the construction of association rules relating item sets of items within a large number of transactions of the transaction database 102. Moreover, even to the extent that such analyses may be performed, it may be difficult or impossible for the provider of the system 100 to do so with a desired level of frequency and/or accuracy.

Thus, in the example of FIG. 1, as referenced above, the association accelerator 110 may be configured to perform various operations associated with the transaction database 102, to thereby facilitate optimized subsequent operations of the association rule selector 112. In this way, the provider of the system 100 may construct association rules having, or nearly having, desired levels of accuracy. Moreover, such association rules may be constructed more quickly and more frequently, and with considerably fewer computational resources being required. Still further, as described in detail below, e.g., with respect to FIGS. 4-7, the system 100 enables a high level of customization with respect to a desired trade-off between a level of precision/completeness of constructed association rules, as compared to a conservation of use of available computing resources.

For example, as shown, the association accelerator 110 may include a sampler 118, which may be configured to sample transactions of the transaction database 102. For example, in scenarios in which the transaction database 102 includes 100,000 transactions, one million transactions, or more, the sampler 118 may select a relatively small percentage of the transactions (e.g., 5%, or 10%). Example techniques for selecting a desired sampling rate, and for otherwise operating the sampler 118, are provided in more detail below.

Further with respect to the association accelerator 110, a filter 120 may be configured to operate in conjunction with the sampler 118, in order to adaptively determine a filtered subset of sampled transactions provided by the sampler 118. More specifically, as described in more detail herein, the filtered subset of the sample transactions may be defined to include only those items which occur most frequently within the sample transactions, and thus within the transaction database 102 as a whole.

Then, with respect to both the sampler 118 and/or the filter 120, a view generator 122 may be configured to provide a graphical user interface (GUI) 124, and to thereby provide one or more distribution visualizations 124A to be utilized by an operator of the system 100 in parameterizing or otherwise configuring operations of the sampler 118 and/or the filter 120. For example, examples of such distribution visualizations 124A are provided below with respect to FIGS. 4-7. As described in detail below in conjunction therewith, the distribution visualizations 124A may be utilized, for example, to select a desired sampling rate to be utilized by the sampler 118, and/or to select a desired filter cut-off or threshold to be utilized by the filter 120.

Thus, the association rule selector 112 may receive sampled, filtered transactions from the association accelerator 110, and may thereafter proceed to analyze the sampled, filtered transactions, e.g., to identify frequently-occurring item sets therein, and to thereby provide association rules linking item sets which are determined to be present within the sampled, filtered transactions with a specified minimum level of support and/or confidence, or having some other additional or alternative association metric, as specified by the operator of the system 100.

Then, as referenced above and described in more detail below, e.g., with respect to FIG. 3, the recommender 114 may be configured to receive the resulting association rules, and to thereafter utilize the association rules in conjunction, e.g., with customer-specific records, or other criteria associated with identifying, projecting, or predicting preferences of customers or groups of customers. Then, as shown and described, the recommender 114 may provide one or more resulting recommendation lists 116 to such customers or potential customers.

In the example of FIG. 1, the association accelerator 110, the association rule selector 112, and the recommender 114 are illustrated as being executed using at least one computing device 126. As shown, the at least one computing device 126 may include at least one processor 126A as well as a computer readable storage medium 126B. In this way, instructions for executing the association accelerator 110, the association rule selector 112, and the recommender 114 may be stored using the computer readable storage medium 126B, and executed using the at least one processor 126A.

Of course, FIG. 1 provides a highly simplified example for such implementations of the system 100. Thus, it may be appreciated that the system 100 may include many additional or alternative components, not specifically illustrated therein for the sake of brevity and simplicity.

For example, the at least one computing device 126 may include various components for providing power, network connectivity, or interacting with users (e.g., input/output devices, as well as other peripheral devices). In particular, the at least one computing device 126 may be associated with an appropriate display device for explaining the GUI 124 and associate distribution visualizations 124A.

Further, it may be appreciated that the at least one computing device 126 may be implemented using two or more computing devices in communication with one another. Similarly, the at least one processor 126A may represent two or more processors operating in parallel. Further, the computer readable storage medium 126B may represent two or more computer memories, which may be utilized to store instructions associated with executing the system 100, as referenced above, and/or to store data, including data associated with the transaction database 102.

Figure 2:
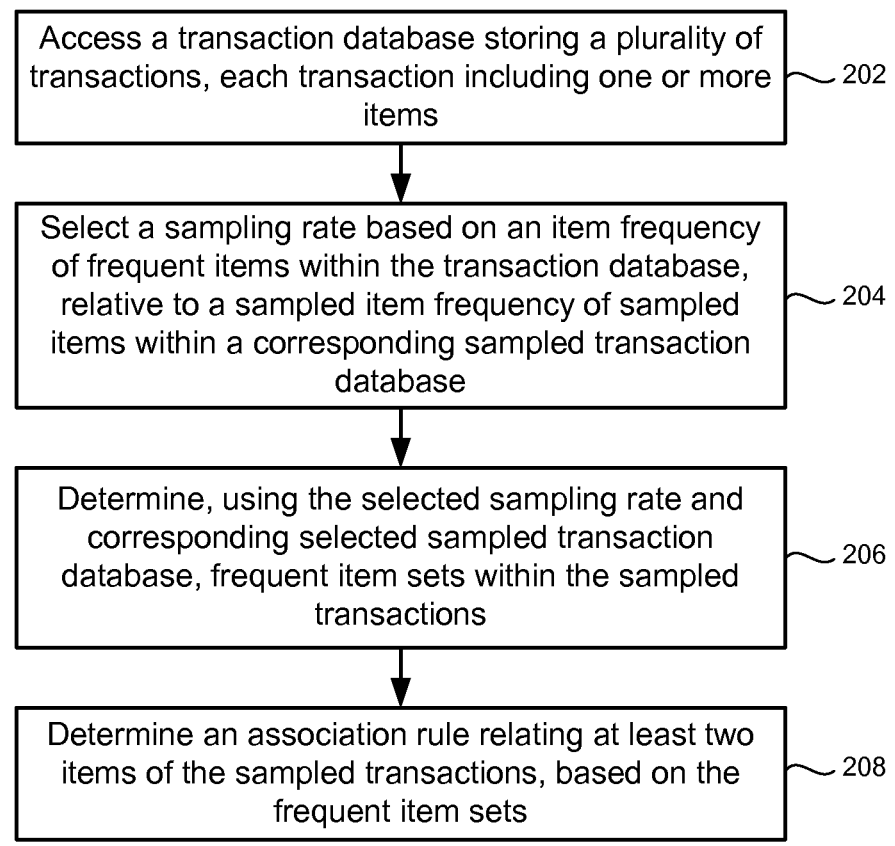
FIG. 2 is a flowchart illustrating example operations of the system of FIG. 1.

FIG. 2 is a flowchart 200 illustrating example operations of a system 100 of FIG. 1. In the example of FIG. 2, operations 202-208 are illustrated as separate, sequential operations. However, it may be appreciated that two or more of the operations 202-208 may be performed in a partially or completely overlapping or parallel manner, or in a nested, iterative, or looped fashion. Moreover, additional or alternative operations may be included, and one or more operations may be omitted.

In the example of FIG. 2, a transaction database storing a plurality of transactions may be accessed, each transaction including one or more items (202). For example, the sampler 118 may be configured to access the transaction database 102, which, as shown and described, includes the various transactions 104, 106, 108, as well as corresponding items 104A-104D, 108A, 108B.

A sampling rate may be selected, based on an item frequency of frequent items within the transaction database, relative to a sampled item frequency of sampled items within corresponding sampled transaction database (204). For example, the sampler 118 may sample the transactions of the transaction database 102 to obtain a corresponding sampled transaction database (not specifically illustrated as such in the example of FIG. 1). As shown and described below with respect to FIGS. 4-7, the sampler 118 may be configured to select the sampling rate such that a frequency of occurrence of a particular item (e.g., the item 104A) within the sampled transaction database is, to a desired extent, the same or approximately the same as a frequency of occurrence of the same item within the original transaction database 102. In this way, as also described below, the sampler 118 may ensure a validity of association rules which are ultimately determined by the association rule selector 112, while significantly reducing processing requirements imposed on the at least one processor 126A. In selecting the sampling rate, the sampler 118 may, in some implementations, rely primarily or exclusively on the most-frequently occurring items within the transaction database and/or the sampled transaction database(s), which may then be used primarily or exclusively in formulating association rules, as referenced above and described in detail, below.

Using the selected sampling rate and corresponding sampled transaction database, frequent item sets within the sampled transactions may be determined (206). For example, the association rule selector 112 may determine such frequent item sets from within sampled transactions of the sampled transaction database.

An association rule relating at least two items of the sample transactions may be determined, based on the frequent item sets (208). For example, the association rule selector 112 may determine an association rule which relates two or more items of a frequently-occurring item set, when, e.g., the two or more items occur with a minimum level of support and/or confidence within the frequent item sets of the sampled transaction database.

Figure 3:
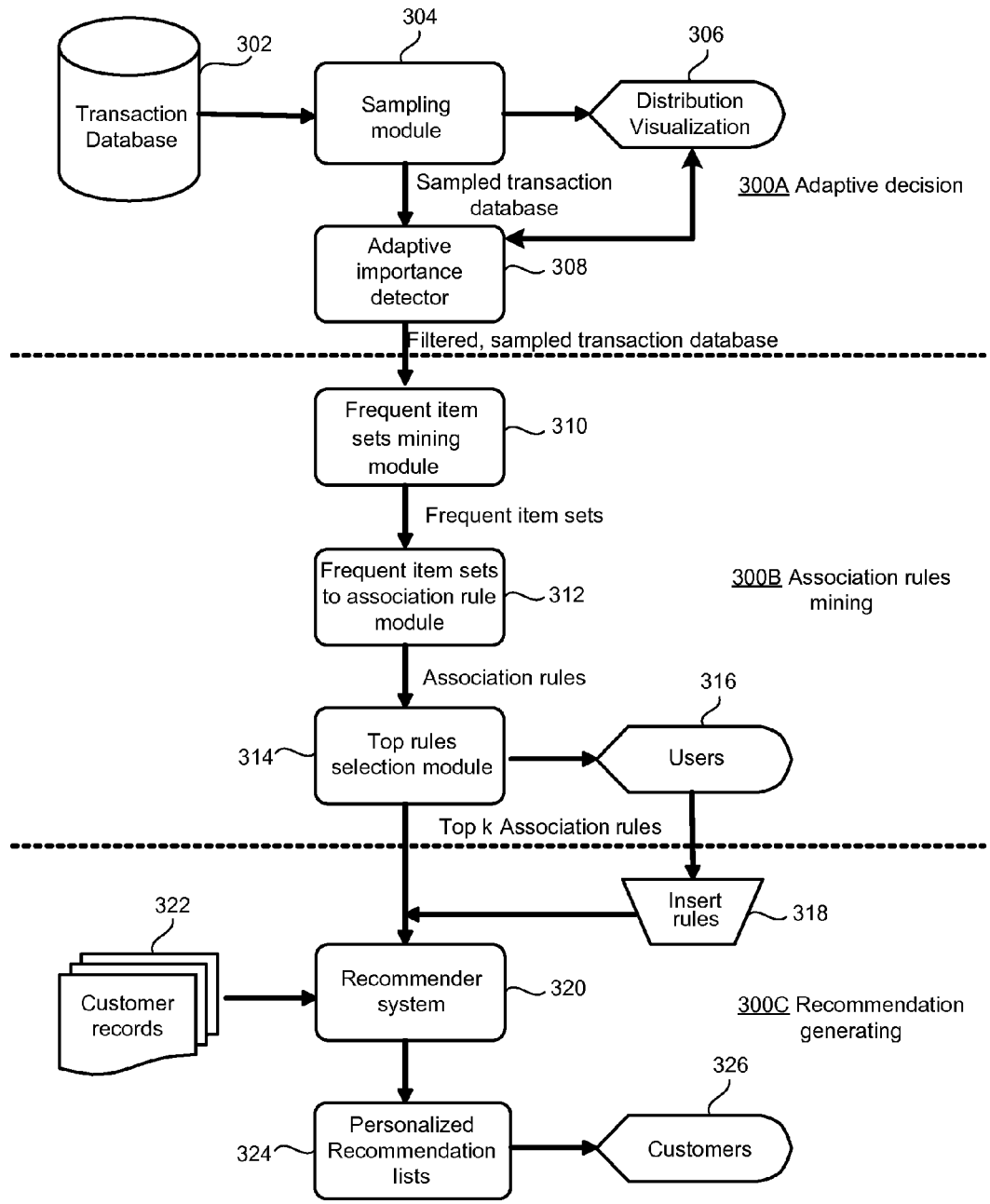
FIG. 3 is a block diagram of a recommender system utilizing the association acceleration techniques of the system of FIG. 1.

FIG. 3 is a block diagram of a system 300 illustrating a more detailed example implementation of the system 100 of FIG. 1 and associated operations 202-208 of FIG. 2. In the example of FIG. 3, in adaptive decision-making layer 300A, a transaction database 302 is sampled by a sampling module 304. As referenced above with respect to FIG. 2, the sampling module 304 may sample the transaction database 302 in a manner which ensures, to a desired level of accuracy, correspondence between the frequency of occurrence of items within a resulting sampled transaction database, relative to the frequency of occurrence of such items within the original transaction database 302. In order to assist in accomplishing this objective, as referenced above with respect to FIG. 1, distribution visualization 306 may be provided (e.g., by the view generator 122 of FIG. 1), which visually illustrates relative levels of accuracy achieved by the sampling module 304 for different sampling rates, so that an operator of the system 300 may thereby select a sampling rate which achieves a desired level of accuracy. Examples of the distribution visualization 306 in this regard are provided below, e.g., with respect to FIGS. 4 and 6.

Further in the example of FIG. 3, an adaptive importance detector 308 provides a more specific example of the filter 120 of FIG. 1. Specifically, as referenced above, the adaptive importance detector 308 may filter transactions of the sampled transaction database, based on a frequency of occurrence of individual items therein. That is, for example, the adaptive importance detector 308 may filter the sampled transaction database to remove items that occur relatively infrequently within the transaction database 302 and/or the sampled transaction database itself. Again, a corresponding distribution visualization 306 may be provided, e.g., by the view generator 122 of FIG. 1, in order to assist the operator of the system 300 in selecting a threshold for executing such filtering. Specific examples of the distribution visualization 306 in this regard are provided below, with respect to FIGS. 4 and 6.

In summary, the sampling module 304 may be configured to sample the transaction database 302 and plot curves of the distributions of the items and the sampled items for presentation to the user as part of the distribution visualization 306. Meanwhile, the sampling module 304 also transfers the distribution and the sampled transactions to the adaptive importance detector, which adaptively filters out a selected subset of infrequently-occurring items. In other words, the adaptive importance detector 308 may eliminate other items, (e.g., infrequently occurring items), which are not to be included with the remaining items in the sampled transaction database.

Thus, it may be observed that an adaptive decision process 300A may be executed which ultimately provides a filtered, sampled transaction database for use in an association rules mining process 300B. Specifically, as shown, a frequent items set mining module 310 may be configured to analyze the filtered, sampled transaction database to detect sets of two or more items which occur with a certain minimum frequency therein.

As a result, frequent item sets may be passed to a frequent item sets to association rule module 312. As referenced above, such a module may be configured to analyze the frequent item sets to thereby formulate one or more association rules. In so doing, one or more commonly-known association rule algorithms may be utilized, e.g., the Apriori algorithm, the Eclat algorithm, the FP-growth algorithm, the Scanned Once algorithm, or the Partition algorithm, to name a few.

Subsequently, a top rule selection module 314 may provide the association rules to one or more users 316 of the system 300, and may thereafter receive a selection from the users 316 of association rules considered to be most useful or most applicable.

Then, in a recommendation generating layer 300C, the confirmed association rules may be inserted 318 into a recommended system 320, which makes use of available customer records 322 to generate personalized recommendation lists 324. For example, the recommendation system 320 may utilize known techniques, such as the item-based collaborative filtering approach, which calculates item similarities, which may then be updated based on the confirmed association rules. Then, items having a strongest similarity with items that a particular customer previously purchased may thereafter be recommended to corresponding ones of customers 326.

Figure 4:
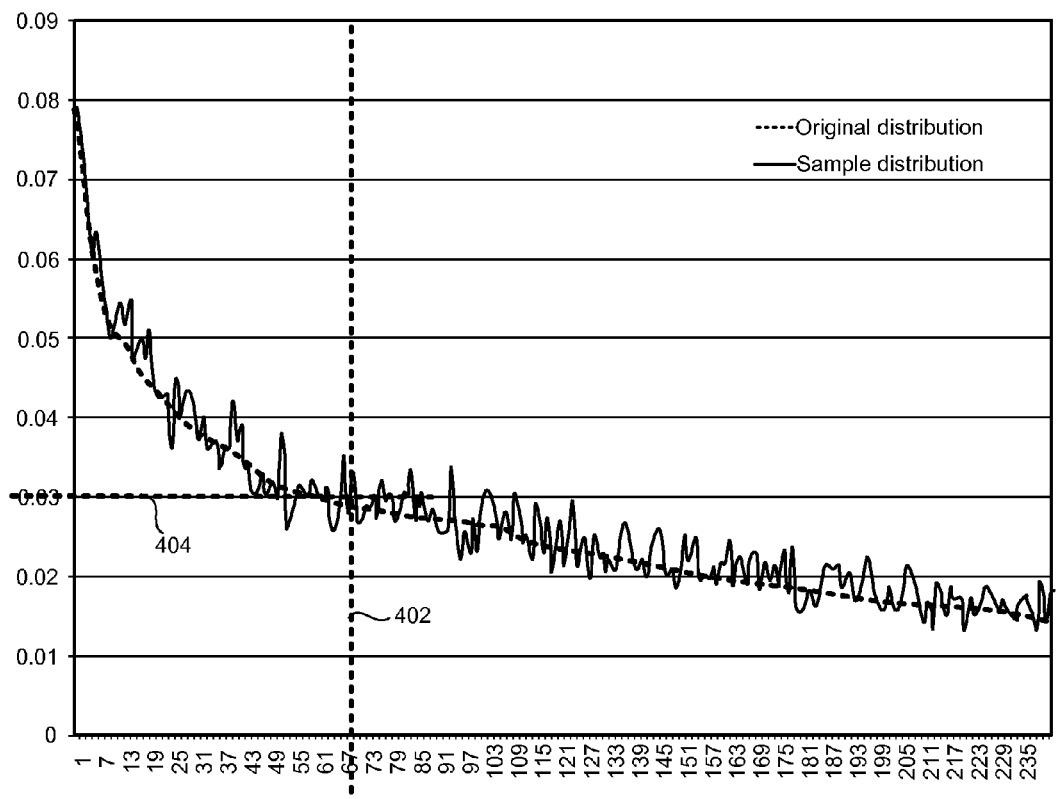
FIG. 4 is a graph illustrating item distributions within transactions and sampled transactions.

FIG. 4 is a graph illustrating a comparison between an original distribution of a frequency of each item in an original transaction database, compared to a sample distribution of a frequency of the same items within a sampled transaction database. In the specific example of FIG. 4, a total number of transactions is five million, and a sample size is 8,000.

Thus, it may be appreciated that FIG. 4 provides an example of the distribution visualization 124A and/or the distribution visualization 306 of FIG. 3. Specifically, as just referenced, FIG. 4 illustrates a relative item frequency of items within a transaction database to corresponding item frequencies of the same items within a sampled transaction database, obtained for a particular sampling rate.

It may be observed in the example of FIG. 4 that the sample distribution closely tracks and matches the original distribution. Thus, FIG. 4 validates the sampling approach described herein. Thus, FIG. 4 may be understood to represent or illustrate operations of the sampler 118 of FIG. 1 and/or the sampling module 304 of FIG. 3.

Further, as represented by decision edges 402, 404, FIG. 4 also demonstrates and illustrates operations of the filter 120 of FIG. 1, and/or the adaptive importance detector 308 of FIG. 3. Specifically, the decision edge 402 indicates a subset of items which occur most frequently within the distribution, and relates the items occurring above the decision edge 402 to a minimum frequency of occurrence within the sample distribution, as shown by the decision edge 404.

In practice, an operator of the system 100, 300 may select the decision edges 402, 404 in any desired or appropriate fashion. For example, by way of the GUI 124 of FIG. 1, a system operator may adjust the decision edges 402, 404 in a graphical manner, e.g., simply by sliding the decision edges 402, 404 to a desired point within the graph of FIG. 4. In this regard, in general, it may be appreciated that the inclusion of more items (i.e., corresponding to movement of the decision edge 402 to the right in FIG. 4) will result in more accurate and complete association rules being formulated, but at a potential cost of increased computational resources being required. Conversely, inclusion of fewer items (i.e., corresponding to movement of the decision edge 402 to the left in FIG. 4) may sacrifice a level of accuracy or completeness of resulting association rules, but with a potential benefit of increased speeds and fewer computational resources. Further, as described and illustrated below with respect to FIG. 6, selection of the decision edges 402, 404 may depend in part on an underlying shape of the sample distribution itself.

Figure 5:
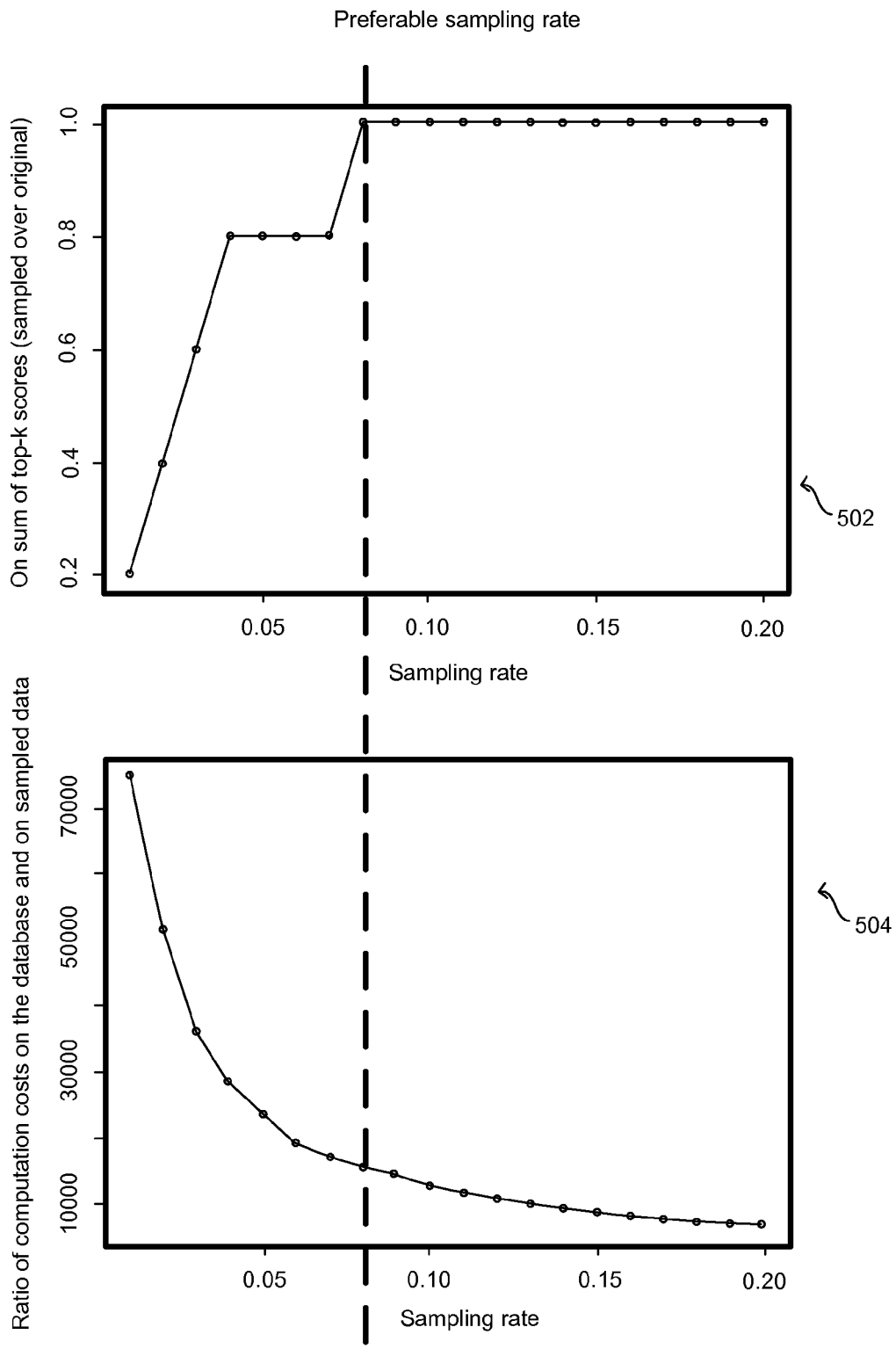
FIG. 5 illustrates a pair of graphs for selecting a sampling rate to be used in the systems of FIGS. 1 and 3, in conjunction with the distributions of FIG. 4.

FIG. 5 illustrates graphs 502 and 504, which demonstrate a comparison between a sampling accuracy for various sampling rates with a ratio of computational costs when comparing operations on an original transaction database and a corresponding sampled transaction database. Thus, as shown and described, the graphs 502, 504 of FIG. 5 illustrate relative levels of sampling accuracy and computational cost savings for a plurality of possible sampling rates, so that a system operator may easily select a specific sampling rate which accomplishes a desired objective with respect to the trade-off between sampling accuracy and computational costs.

In the context of the graph 502, as referenced above, the sampling accuracy represents a number of occurrences of items captured in the sample data, with respect to a corresponding number of occurrences of the same items captured or included in the corresponding original transaction database. In other words, with respect to FIG. 4, the sampling accuracy generally indicates an extent to which the sample distribution matches the original distribution.

Thus, the graph 502 illustrates sums of top-k scores of item frequencies within sampled transaction databases corresponding to various possible sampling rates, where the top-k scores may be selected and defined by the system operator, e.g., as described above with respect to FIG. 4. Thus, in the example of FIG. 5, it may be observed that a sampling rate of approximately 8% captures all or nearly all of the top-k scores, while corresponding to an improvement and processing speed of over 15,000 times. As may be appreciated from the graphs 502, 504, moving the sampling rate to the left would result in lower accuracy and high speed, while moving the sampling rate to the right would conversely result in higher accuracy and lower speeds.

Figure 6:
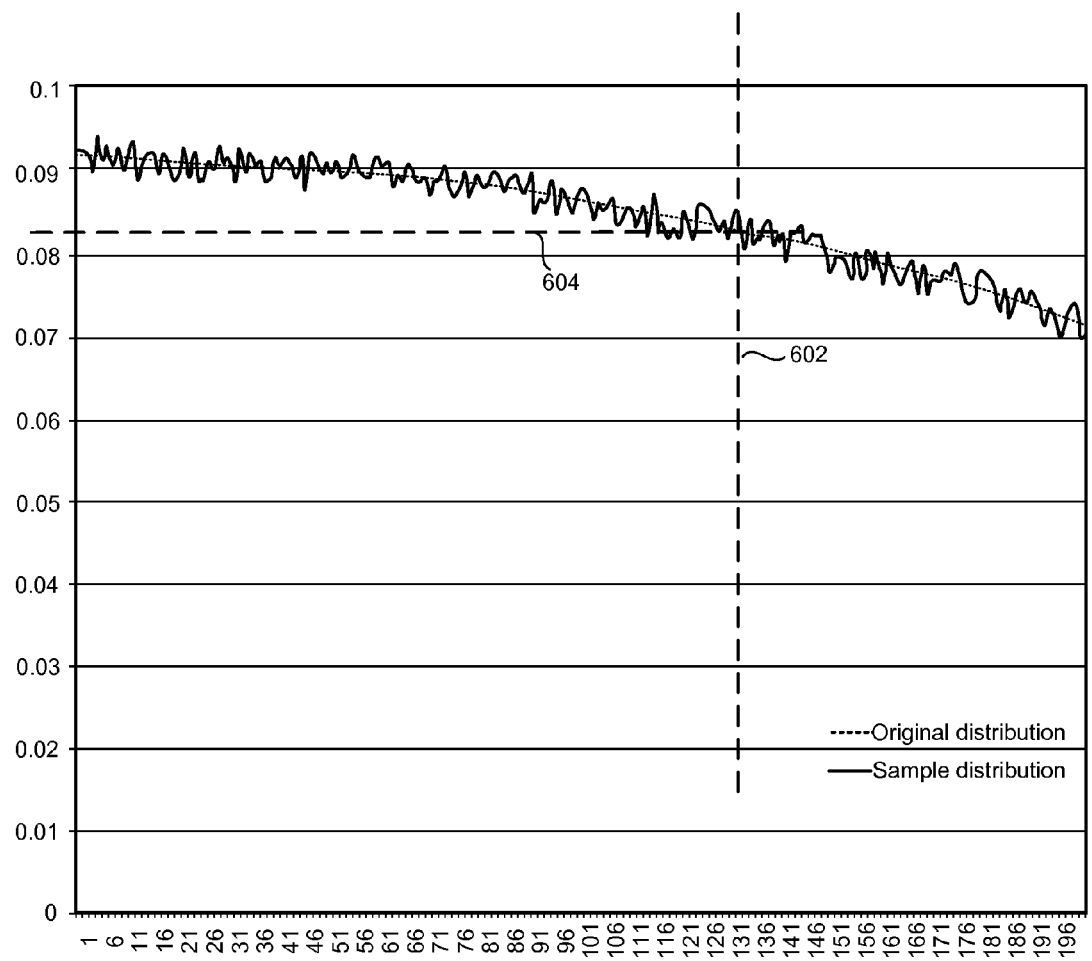
FIG. 6 is a second graph illustrating a second item distributions within a second transaction database and associated sampled transactions.

FIG. 6 is a graph corresponding conceptually to FIG. 4, but providing a sample distribution and original distribution for a different transaction database. Specifically, as shown, the transaction database sampled in conjunction with FIG. 6 is illustrated as including a relatively higher frequency of occurrence of a larger number of items, when compared to the original transaction database of FIG. 4.

Thus, as referenced above with respect to FIG. 4, the decision edge 602 and corresponding minimum frequency represented by decision edge 604 may be set to be inclusive of a larger number of items within the sample distribution. Of course, it may be appreciated that placement of the decision edge 602, 604 may still be subject to specific preferences of the system operator. Nonetheless, FIG. 6 illustrates the general principle that, all things being equal, distributions which descend or decline relatively gradually with respect to item frequency may be associated with relatively more inclusive decision edges.

Figure 7:
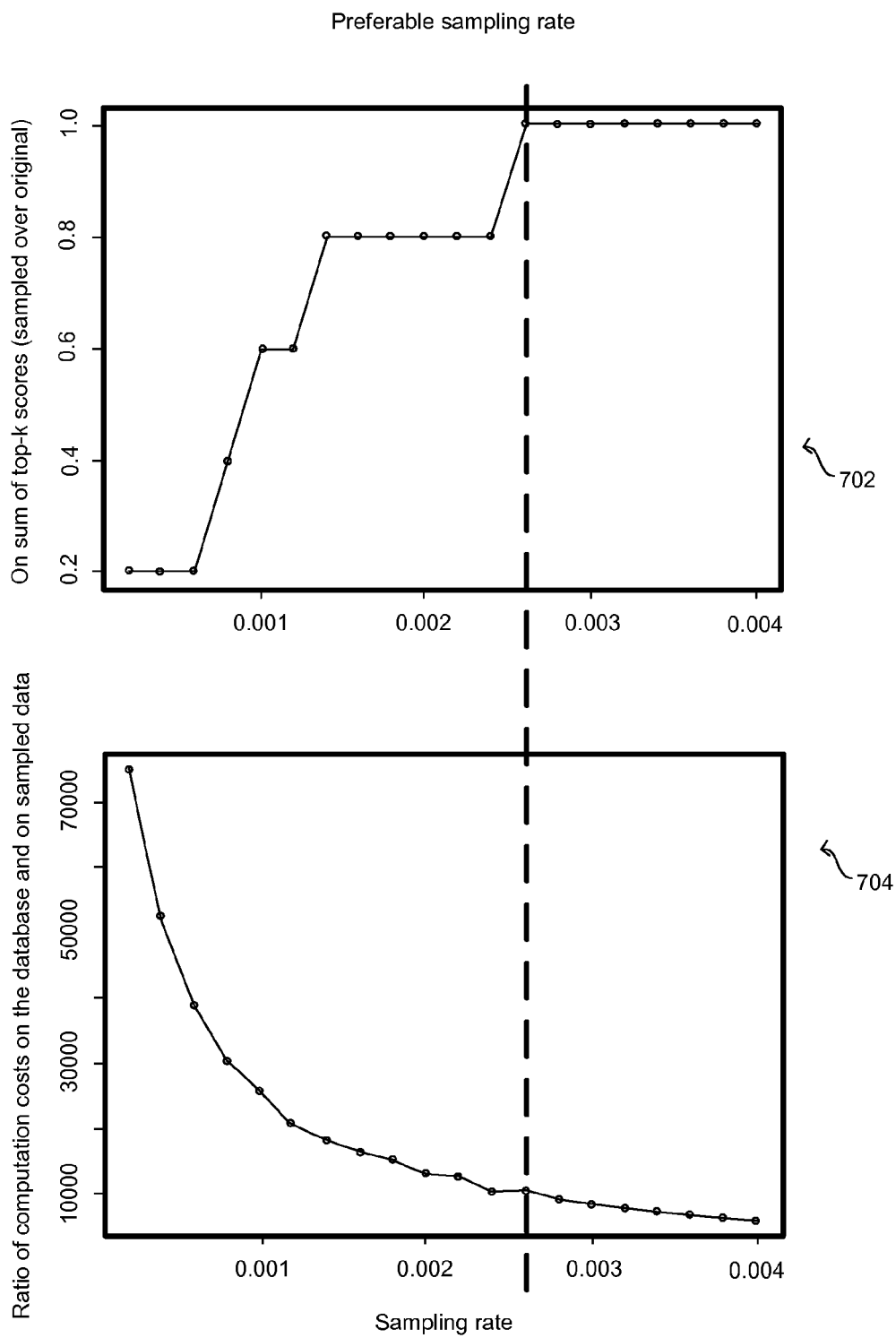
FIG. 7 illustrates a second pair of graphs utilized in selecting a sampling rate to be used in the system of FIGS. 1 and 3, in conjunction with the distributions of FIG. 6.

FIG. 7 illustrates a pair of graphs 702, 704 which correspond to the graphs 502, 504 of FIG. 5, but which are constructed with respect to the transaction database and sampled transaction database of FIG. 6. As shown, FIG. 7 illustrates that when the sampling rate is 0.2%, the top-k items of the sample distribution achieve approximately the same score as the original top-k items, but with an improvement in speed of over 12,000 times. As another example, when the sample rate is 0.14%, the top-k items of the sample distribution achieve approximately 80% of the score of the original top-k items, with an improvement in speed of over 16,000 times. By way of specific illustration, as shown, the example of FIG. 7 demonstrates a selected sample rate of 0.26%, which may be considered to provide an acceptable trade-off between accuracy and speed.

Figure 8:
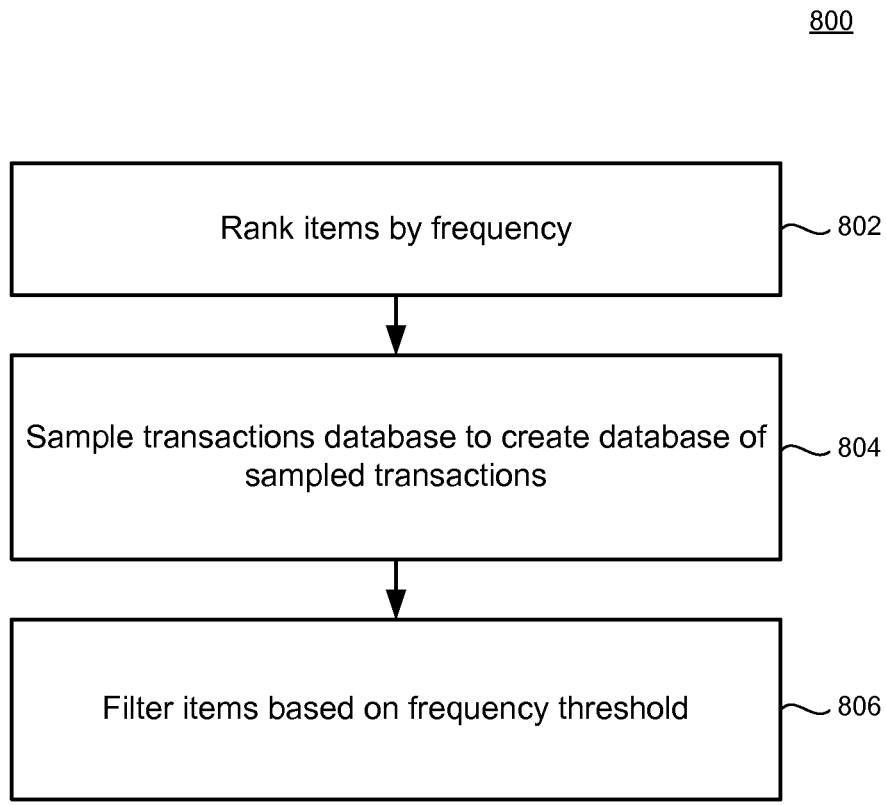
FIG. 8 is a flowchart illustrating example operations for utilizing the graphs of FIGS. 4 and 6.

FIG. 8 is a flowchart 800 illustrating more detailed example operations of the systems 100 and 300 of FIGS. 1 and 3, respectively. In the example of FIG. 8, items within transaction records of a transaction database may be ranked in order, based on relative frequency of each item within the transaction database (802). In this way, for example, the original distributions of FIGS. 4 and 6 may be obtained.

The transaction database may be sampled to create a corresponding database of sample transactions (804). As described above, an appropriate sampling rate may be selected using the techniques described with respect to FIGS. 3-7, and in accordance with the operations of the flowchart 900 of FIG. 9, described in detail below.

Items may be filtered, based on a frequency threshold (806). For example, the decision edges 402, 406 represent such a frequency threshold, below which items may be filtered from the sampled transactions, thereby reducing computational requirements of the association rule selector 112 in, e.g., detecting frequent item sets or otherwise constructing association rules.

Figure 9:
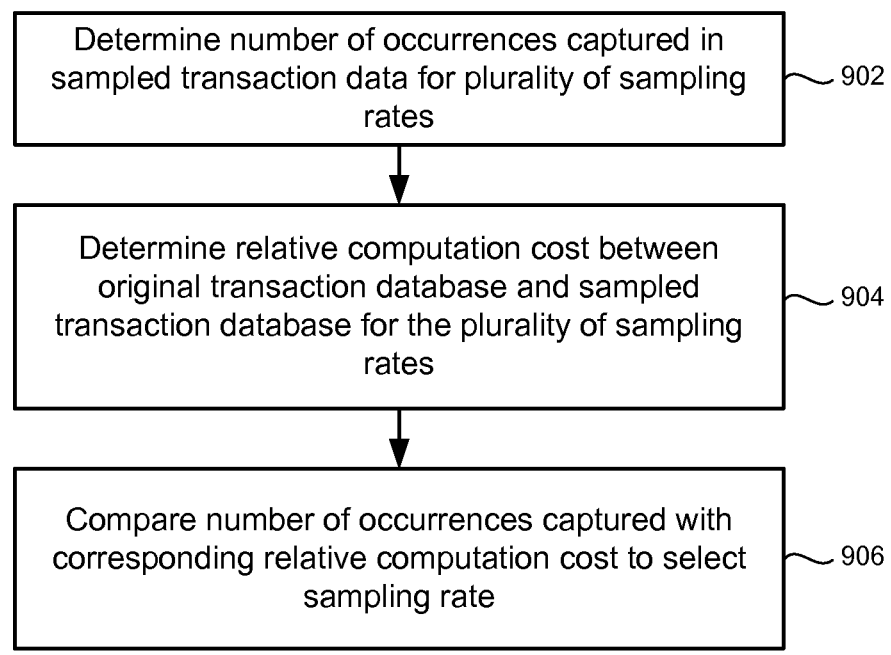
FIG. 9 is a flowchart illustrating example operations to be utilized in selecting sampling rates in conjunction with the graphs of FIGS. 5 and 7.

FIG. 9 is a flowchart 900 illustrating additional detailed examples of operations of the systems 100 and 300 of FIGS. 1 and 3, respectively. In the example of FIG. 9, a number or percentage of occurrences of frequently-occurring items captured within sampled transaction data may be determined for a plurality of sampling rates (902). For example, as described above, the graphs 502 and 702 of FIGS. 5 and 7, respectively, illustrate such a determination.

A relative computation cost between the original transaction database and the sampled transaction database may be determined for the plurality of sampling rates (904). For example, as shown and described with respect to the graphs 504 and 704 of FIGS. 5 and 7, respectively, ratios of computation costs on the original transaction database and the sampled transaction database may be determined.

Then, a number or percentage of occurrences of the frequently-occurring items captured within the sampling data may be compared with a corresponding relative computation cost, to thereby select a desired sampling ratio (906). For example, again as described and illustrated above with respect to FIGS. 5 and 7, sampling rates of, e.g., a percent for FIG. 5 and 0.26% for FIG. 7 may be selected.

It will be appreciated that many different data structures and associated database management techniques may be utilized to construct and implement the transaction databases 102, 302. By way of specific example, Table 1 illustrates a transaction database sample in which a column is included for a transaction identification number, used to access each transaction. A second column may be included which designates a unique customer number associated with a customer who conducted the corresponding transaction, and which can therefore be utilized to access each customer. Meanwhile, a corresponding customer item set column lists each item purchased by the customer in a corresponding transaction. Finally, as shown, a date of each transaction may be included in the final example column.

| Transaction # | Customer # | Items | Date |
|---|---|---|---|
| 0 | 0 | $I_1, I_2, I_3, I_6, I_9, I_{10}$ | 2011-01-01 19:21 |
| 1 | 32 | $I_2, I_3, I_6, I_9, I_{10}, I_{11}, I_{20}, I_{30}$ | 2011-01-01 19:22 |
| 2 | 3 | $I_6, I_9, I_{10}$ | 2011-01-01 19:23 |
| 3 | 1 | $I_1, I_2, I_3$ | 2011-01-01 19:23 |
| 4 | 6 | $I_1, I_2, I_3, I_6, I_9, I_{10}, I_{11}, I_{20}, I_{32}$ | 2011-01-01 19:22 |

Similarly, many different types of instructions may be stored using the computer readable storage medium 126B for implementing the association accelerator 110, the association rule selector 112, and/or the recommender 114. By way of specific example, pseudo code 1 provides pseudo code that may be used by the sampler 118 or the sampling module 304.

PSEUDO CODE 1.

```
SAMPLE MODULE
Input: transaction database, sample size
Output: sub-database
While (iteration < sample size)
    randomly take one transactions;
    insert the sampled transactions into sub-database;
    iteration++;
End-while
End SAMPLE MODULE
```

As may be observed, the pseudo code 1 is configured to randomly extract a transaction from a transaction database for storage within a sampled transaction database.

Meanwhile, pseudo code 2 illustrates example operations of the filter 120 and/or the adaptive importance detector 306.

PSEUDO CODE 2

```
ADAPTIVE IMPORTANCE DETECTION
Input: transaction database, sub-database
Output: Sub-database, important transactions, transaction frequency table
While(doesn't reach the end of database)
    If(Item = Item_k)
        transactions frequency table [Item_k]++;
    End-if
End-while
Cut the distribution resulting in one threshold;
for (iteration = 0; iteration < number of items in the sub-database; iteration++)
    if (transactions [iteration] frequency < threshold)
        Continue;
    else
        insert transactions [iteration] into important transactions
end-for
END ADAPTIVE IMPORTANCE DETECTION
```

As shown, pseudo code 2 utilizes the transaction database and the sampled transaction database to determine relative frequencies, and implements a threshold, below which items are not considered for purpose of, e.g., selecting a sampling rate or constructing association rules.

Also in pseudo code 2, orders corresponding to the frequently-occurring items may be stored within a corresponding filtered, sampled database, referred to as "important orders," within pseudo code 2.

In pseudo code 3, the association rule selector 112 may proceed to identify individual item sets in which an $i^{th}$ and a $j^{th}$ item appear within a single transaction. And, as referenced above and illustrated in pseudo code 3, item sets which exceed a minimum support level may be preserved for use in determination of association rules.

```
PSEUDO CODE 3

FREQUENT ITEM SETS MINING MODULE
INPUT: Sub-database, Important transactions, Minimum support
OUTPUT: C_K
for (iteration = 0; iteration < number of transactions in the important
transactions; iteration++)
        if (transactions[iteration] frequency < Minimum support )
           Continue;
        else
           insert transactions[iteration] into C_1
end-for
While(C_K is not empty)
     for item_i in the C_K
         for item_j in the C_K
             if item_i != item_j
                 new_item_k = Generate a new item sets from
item_i and item_j
                 if the frequency of new_item_k > Minimum
                    support insert new_item_k into C_K
                 else
                    Continue;
                 end-if-else
             end-if
         end-for
     end-for
end-while
END FREQUENT ITEM SETS MINING MODULE
```

Finally, in pseudo code 4, the association rule selector 112 may be configured to convert the frequent item sets obtained from pseudo code 3 into corresponding association rules. As referenced above, and as shown in pseudo code 4, each item set may be considered with respect to a conditional probability that occurrences of any given item implies inclusion of a second item. In other words, it may be determined whether a given item set meets or exceeds a predefined association rule confidence threshold level. If so, then the resulting association rule may be constructed.

```
PSEUDO CODE 4

FREQUENT ITEM SETS TO ASSCIATION RULE MODULE
Input: C_K
Output: association rules
for item set in the C_K
    compute the conditional probability in each item set
    if the conditional probability > association rule confidence
       insert rule into association rules
    else
       Continue;
    End-if-else
End-for
END FREQUENT ITEM SETS TO ASSCIATION RULE MODULE
```

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:

an association rule accelerator configured to cause the at least one processor to access a transaction database storing a plurality of transactions, each transaction including one or more items, a view generator configured to cause the at least one processor to provide at least one visualization via a user interface in order to evaluate a plurality of sampling rates, each of the plurality of sampling rates corresponding to a different level of accuracy between the transaction database and a sampled transaction database, the at least one visualization depicting the levels of accuracy graphed relative to computation resources for the plurality of sampling rates;

the association rule accelerator further configured to cause the at least one processor to receive a selection of a sampling rate among the plurality of sampling rates based on the at least one visualization, the association rule accelerator configured to cause the at least one processor to sample the transactions stored in the transaction database according to the selected sampling rate to obtain the sampled transaction database in a manner that corresponds to the selected sampling rate's level of accuracy between the transaction database and the sampled transaction database, wherein a number of sampled transactions in the sampled transaction database is less than a number of transactions in the transaction database; and an association rule selector configured to cause the processor to determine, using the selected sampling rate and the sampled transaction database, frequent item sets whose occurrence within the sampled transaction database is above a threshold level, and further configured to determine an association rule relating at least two items of the sampled transactions, based on the frequent item sets.

2. The system of claim 1, wherein the association rule accelerator is configured to cause the least one processor to rank, from most frequent to least frequent, the items within the transaction database and the sampled transaction database.

3. The system of claim 1, wherein the sampling rate is determined based on a relative inclusion of the frequent items within the sampled transaction database at the selected sampling rate.

4. The system of claim 3, wherein the at least one visualization provides an amount of the computational resources correlated with an extent to which the frequent items are included within the sampled transaction database at the selected sampling rate.

5. The system of claim 1, wherein the level of accuracy is set such that a frequency of occurrence of an item within the sampled transaction database is approximately the same as a frequency of occurrence of the same item within the transaction database.

6. The system of claim 1, wherein the association rule accelerator includes a filter configured to remove one or more items whose frequency of occurrence is below the threshold value.

7. The system of claim 1, wherein the at least one visualization also includes a distribution visualization depicting a distribution of items within the transaction database and a distribution of items within the sampled transaction database.

8. The system of claim 1, wherein the association rule is based on a number or percentage of occurrences of each frequent item set within the sampled transaction database, and on a conditional probability that inclusion of a first particular item within a frequent item set implies inclusion of a second particular item therein.

9. A computer-implemented method for executing instructions stored on a computer readable storage medium, the method comprising:
accessing a transaction database storing a plurality of transactions, each transaction including one or more items;
providing at least one visualization via a user interface in order to evaluate a plurality of sampling rates, each of the plurality of sampling rates corresponding to a different level of accuracy between the transaction database and a sampled transaction database, the at least one visualization depicting the levels of accuracy graphed relative to computation resources for the plurality of sampling rates;
receiving a selection of a sampling rate among the plurality of sampling rates based on the at least one visualization;
sampling the transactions stored in the transaction database to obtain the sampled transaction database in a manner that corresponds to the selected sampling rate's level of accuracy between the transaction database and the sampled transaction database, wherein a number of sampled transactions in the sampled transaction database is less than a number of transactions in the transaction database;
determining, using the selected sampling rate and the sampled transaction database, frequent item sets whose occurrence with the sampled transaction database is above a threshold level within the sampled transaction database; and
determining an association rule relating at least two items of the sampled transactions, based on the frequent item sets.

10. The method of claim 9, wherein the sampling rate is determined based on a relative inclusion of the frequent items within the sampled transaction database at the selected sampling rate.

11. The method of claim 9, wherein the at least one visualization provides an amount of the computational resources correlated with an extent to which the frequent items are included within the sampled transaction database at the selected sampling rate.

12. A computer program product, the computer program product being tangibly embodied on a computer-readable storage medium and comprising instructions that, when executed, are configured to:
access a transaction database storing a plurality of transactions, each transaction including one or more items;
provide at least one visualization via a user interface in order to evaluate a plurality of sampling rates, each of the plurality of sampling rates corresponding to a different level of accuracy between the transaction database and a sampled transaction database, the at least one visualization depicting the levels of accuracy graphed relative to computation resources for the plurality of sampling rates;
receive a selection of a sampling rate among the plurality of sampling rates based on the at least one visualization, the plurality of sampling rates including a first sampling rate and a second sampling rate, the first sampling rate requiring a higher amount of the computation resources than the second sampling rate;
sample the transactions stored in the transaction database according to the selected sampling rate to obtain the sampled transaction database in a manner that corresponds to the selected sampling rate's level of accuracy between the transaction database and the sampled transaction database, wherein a number of the sampled transactions in the sampled transaction database according to the first sampling rate is higher than a number of the sampled transactions in the sampled transaction database according to the second sampling rate;

determine, using the selected sampling rate and the sampled transaction database, frequent item sets whose occurrence with the sampled transaction database is above a threshold level within the sampled transaction database; and determine an association rule relating at least two items of the sampled transactions, based on the frequent item sets.

13. The computer program product of claim 12, wherein, in order to select the sampling rate, the instructions, when executed, are configured to rank, from most frequent to least frequent, the items within the transaction database.

14. The computer program product of claim 12, wherein the sampling rate is determined based on a relative inclusion of the frequent items within the sampled transaction database at the selected sampling rate.

15. The computer program product of claim 14, wherein the at least one visualization provides an amount of the computational resources correlated with an extent to which the frequent items are included within the sampled transaction database at the selected sampling rate.

16. The computer program product of claim 12, wherein the level of accuracy is set such that a frequency of occurrence of an item within the sampled transaction database is approximately the same as a frequency of occurrence of the same item within the transaction database.

17. The computer program product of claim 12, wherein the at least one visualization further includes a distribution visualization depicting a distribution of items within the transaction database and a distribution of items within the sampled transaction database.

18. The computer program product of claim 12, wherein the association rule is based on a number or percentage of occurrences of each frequent item set within the sampled transaction database, and on a conditional probability that inclusion of a first particular item within a frequent item set implies inclusion of a second particular item therein.

* * * * *